United States Patent [19]

Kaiser

[11] 4,072,984
[45] Feb. 7, 1978

[54] CHROMINANCE-LUMINANCE SEPARATOR

[75] Inventor: Arthur Kaiser, Trumbull, Conn.

[73] Assignee: Thomson-CSF Laboratories, Inc., Stamford, Conn.

[21] Appl. No.: 567,730

[22] Filed: Apr. 14, 1975

[51] Int. Cl.$^2$ ............................................. H04N 9/535
[52] U.S. Cl. ............................................. 358/31
[58] Field of Search ...................... 358/31, 37, 39, 21, 358/38, 36

[56] References Cited

U.S. PATENT DOCUMENTS

| | | | |
|---|---|---|---|
| 2,855,573 | 10/1958 | Fredendall | 358/31 X |
| 2,895,004 | 7/1959 | Fredendall | 358/38 |
| 3,542,945 | 11/1970 | Parker | 358/31 |
| 3,858,240 | 12/1974 | Golding et al. | 358/31 X |
| 3,924,266 | 12/1975 | Harwood | 358/38 |

Primary Examiner—Howard W. Britton
Assistant Examiner—Mitchell Saffian
Attorney, Agent, or Firm—Martin Novack

[57] ABSTRACT

An arrangement for the elimination of spurious chrominance component in the main luminance output signal from a chrominance-luminance separator of the comb filter type. The full band luminance signal from the comb filter is applied as one input to a switching circuit and the luminance component is also filtered by a low pass filter having a characteristic to roll off at the chrominance subcarrier frequency and applied as a second input to the switching circuit. The switching circuit is arranged to normally transmit the full band luminance component and to be switched to couple the filtered luminance signal only upon occurrence of spurious chrominance components in the luminance signal. The switching circuit is actuated by a control signal derived by comparing the top and bottom line signals in the comb filter and producing a gating signal for the switching circuit when there is a difference in the chrominance in the top and bottom lines.

10 Claims, 1 Drawing Figure

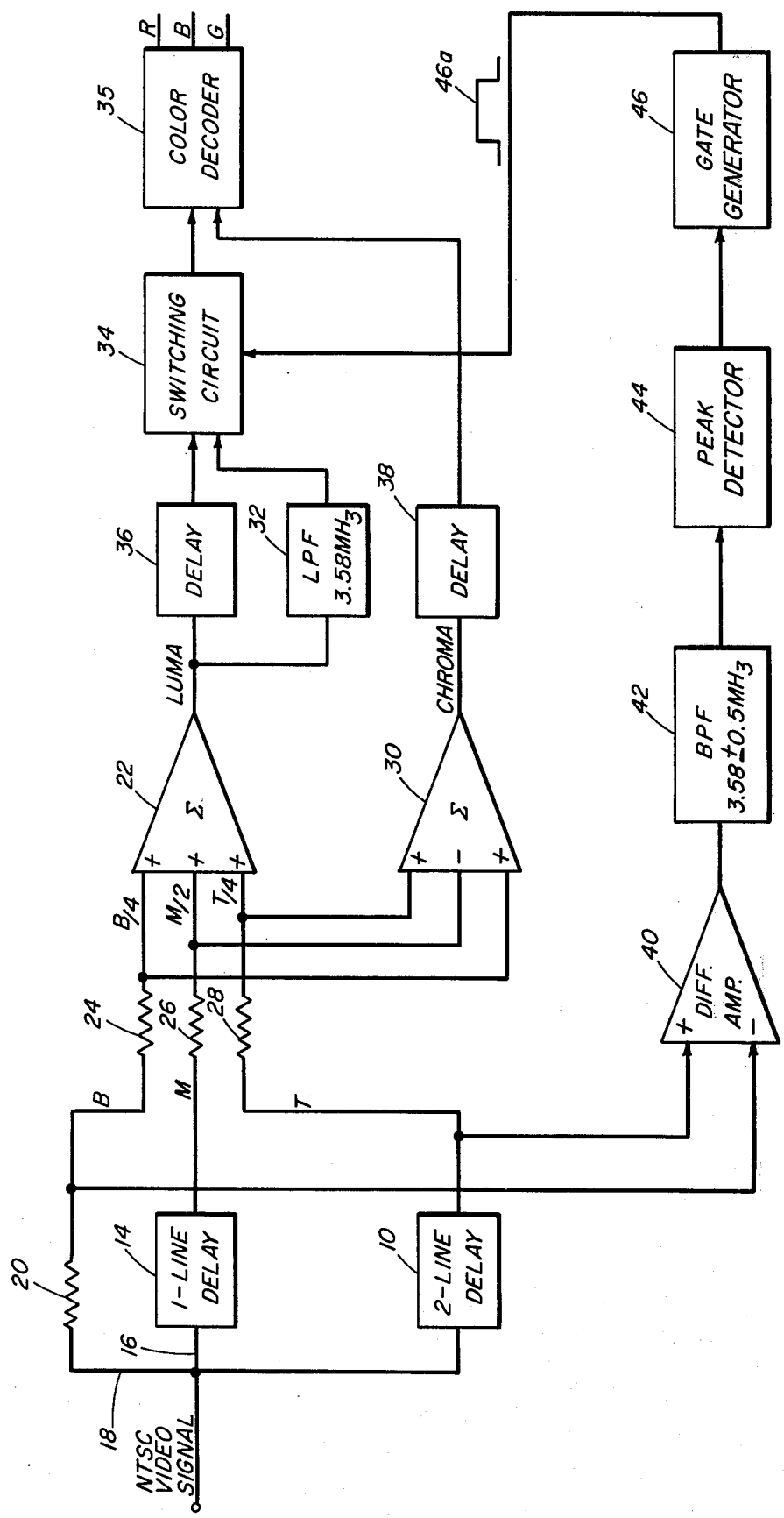

CHROMINANCE-LUMINANCE SEPARATOR

BACKGROUND OF THE INVENTION

This invention relates to television apparatus, and, more particularly, to apparatus for the separation of the luminance and chrominance components of an NTSC color television signal.

Color decoders employed in the NTSC system of color television require as a first step the separation of the luminance and chrominance components of the video signal, this function occasionally being performed by a comb filter. In a typical comb filter, the incoming video signal is separated by suitable delay lines into a main (M) line component and two adjacent line components, usually referred to as "top" (T) and "bottom" (B) signals, the main and top signals being delayed by one and two horizontal lines, respectively, relative to the bottom signal. Because the chrominance signal reverses in phase from line to line, when the main (M), top (T) and bottom (B) signals are added together in the amplitude ratios of T/4 + B/4 + M/2, the chrominance component of the video signal is cancelled thereby to derive the luminance component. By the same token, when M/2 is subtracted from the sum of B/4 + T/4, the luminance component is cancelled so as to produce the negative of the chrominance component, theoretically free of any luminance signal.

As a practical matter, however, the above-described cancellation obtains only if there have been no changes in the picture as it is "scanned" from top to bottom through the three lines; that is, cancellation of chrominance is complete only if it is assumed that the chrominance is identical on all three lines. This assumption is usually true for large areas of the picture, but should a color transition take place vertically, such as might occur with a change in hue, so that the chrominance on the top line does not have the same phase as the chrominance on the bottom and main lines, some of the chrominance signal is not cancelled, and spurious chrominance signals appear in the luminance signal. Because it is the luminance component that determines the brightness of the picture, the uncancelled chrominance component with its 3.58MHz subcarrier superimposed on the luminance signal causes a very noticeable scintillation in the display along the line of color transition, particularly in large screen television displays where every line is quite marked.

The primary object of the present invention is to provide comb filter apparatus for color television systems which removes spurious chrominance signals appearing in the luminance signal output of the comb filter, thereby to improve the quality of the television display.

SUMMARY OF THE INVENTION

This and other objects are accomplished by providing a comb filter which separates an NTSC video signal into a main line component and two adjacent line components, and adds preselected amplitude proportions of the main and adjacent line components to produce a luminance signal, which may contain some chrominance signal because of imcomplete chrominance cancellation. Alternatively, a luminance signal is produced when a chrominance comb is used and its output is subsequently subtracted from the full video. However, the uncancelled chrominance effect is identical. The luminance signal is applied as one input to a switching circuit, and is also applied to a low pass filter having characteristics such as to roll off any 3.58MHz component that might be present in the luminance signal, and the output of the filter is applied as a second input to the switching circuit. In the normal operating condition of the switching circuit the full band luminance signal is coupled to the color decoder, and in another position the filtered luminance signal is transmitted. The switching circuit is activated to its second condition by a control signal obtained by subtracting one of the adjacent line component signals from the other to produce a difference signal in the event there is a change in the chrominance component between two adjacent lines, band-pass filtering the difference signal in a filter designed to pass frequencies in the range of 3.58 ± 0.5MHz, peak detecting the output signal from the filter to obtain the envelope of the signal passed by the filter, and in response to the output signal from the peak detector generating a gating signal for the switching circuit, the duration of which is equal to the duration of the spurious chrominance signal. The switching circuit is so arranged that in the absence of a gating pulse, that is, in the absence of spurious chrominance signals, the full-band luminance signal from the comb filter is transmitted to a color decoder, for example, and when there is a gating pulse the filtered luminance signal is coupled to the decoder. Thus, the switching circuit is selectively gated to eliminate spurious chroma signals in the luminance signal applied to the color decoder.

BRIEF DESCRIPTION OF THE DRAWINGS

A better understanding of the invention will be had from the following detailed description, taken in conjunction with the accompanying drawing, the single FIGURE of which is a block diagram of a comb filter embodying the invention.

DESCRIPTION OF THE PREFERRED EMBODIMENT

In the system illustrated in FIG. 1, the NTSC video signal, which contains luminance and chrominance components, is applied simultaneously to the input terminal of a two-line delay line 10 through a conductor 12, to the input terminal of a one-line delay line 14 through a conductor 16 and through a conductor 18, which may include a resistor 20, to one input terminal of a summing circuit 22. The two-line delay line 10 delays the input video signal for a period of two lines or 127 microseconds, and the one-line delay line 14 delays the input video signal for a period of 63.5 microseconds or one line. By introducing time delays corresponding to one and two lines of scanned area, three adjacent line components of the video signal are aligned with respect to time. For example, lines 5, 3 and 1 are present simultaneously at the conductor 18 and at the output terminals of delay lines 14 and 10 respectively, followed by lines 7, 5 and 3, and then lines 9, 7 and 5, during each odd field scansion and lines 6, 4 and 2 and then 8, 6 and 4, etc., are present simultaneously at the conductor 18 and at the output terminals of the delay lines 14 and 10, respectively, during each even field scansion. The once-delayed component of the video signal becomes the main line (M) component, the twice-delayed component becomes what is typically termed the "top" (T) component and the undelayed component at conductor 18 is known as the "bottom" (B) component.

Thereupon, the B, M and T components are coupled to the summing circuit 22 through respective attenuators 24, 26 and 28 having values such that the components are added in summing circuit 22 in the amplitude ratios of B/4 + T/4 + M/2. Because the chrominance signal reverses in phase from line to line, when the components are added in this ratio, the chrominance component of the video signal is cancelled and the luminance component is obtained at the output of summing circuit 22. By the same token, by subtracting M/2 from the sum of B/4 + T/4 in a second summing circuit 30, the luminance component of the video signal is cancelled so as to produce at the output of summing circuit 30 the negative of the chrominance component, theoretically free of any luminance signal.

It will be evident that the above-described cancellation of the chrominance component to obtain the luminance component is achieved only if there has been no vertical color change in the picture in the time interval occurring between the three lines involved in the cancellation process; that is, cancellation is complete only if it is assumed that the chrominance is vertically identical on all three lines. Although this assumption is realistic for large areas of most scenes, there frequently are vertical color transitions, such as might occur with a change in hue, such that the chrominance of the "top" line would not have the same phase as the chrominance component on the bottom and main lines, with the result that the chrominance cancellation is incomplete, causing spurious chrominance signals to appear in the luminance component. The uncancelled chrominance component with its 3.58MHz subcarrier superimposed on the luminance component causes a very noticeable scintillation in the display at the point of color transition.

In accordance with the present invention, the spurious chrominance signals appearing in the luminance signal at the output of summing circuit 22 are removed by filtering the luminance component and applying the filtered luminance signal to the color decoder during periods when spurious signals appear in the luminance signal. To this end, the luminance signal from summing circuit 22 is applied to a low pass filter 32 having characteristics such as to roll off any 3.58MHz component that might be present in the luminance signal, and the output of the filter applied as one input to a switching circuit 34. The unfiltered luminance component is applied as another input to switching circuit 34 through a suitable delay network 36 which compensates for the delay introduced by the filter 32. The output signal from the switching circuit is applied to a conventional color decoder 35 along with the chrominance component from summing circuit 30, suitably delayed by a delay circuit 38, for obtaining R, B and G signals in the conventional manner. In one position of the switching circuit 34 the full band luminance signal is coupled to the color decoder 35, and in the other stable position the filtered luminance signal from the low pass filter 32 is transmitted.

It being desirable that the full band luminance signal be applied to the color decoder when no spurious chrominance component is present, the switching circuit 34 is arranged to transmit the filtered luminance signal only when such spurious signals are present. To this end, a control system responsive to the instantaneous presence of spurious chrominance signals in the main luminance component is provided to actuate the switching circuit to the condition at which the filtered luminance signal is transmitted. More specifically, the control signal is generated by subtracting the "bottom" line component appearing on conductor 18 of the comb filter from the top line appearing at the output terminal of the two-line delay 10 in a differential amplifier 40 thereby to produce a difference signal at the output of amplifier 40 in the event there is a change in the chrominance component between the top and bottom lines. Since the chrominance component has the same phase in the top and bottom lines, there would be no difference signal if the chrominance component in these two lines is the same. Any difference signal appearing at the output of amplifier 40 is filtered in a pass band filter 42 having a pass band of approximately 1 MHz centered at 3.58MHz so as to pass only the chrominance component and to filter out any uncancelled luminance component that may appear at the output of the differential amplifier. The signal transmitted by the filter 42 is then applied to a peak detector 44, which may be of known design, for producing at its output a signal representing the envelope of the difference chrominance signal. This signal actuates a gate generator 46, which may be a Schmitt trigger circuit, for converting the envelope signal into a rectangular gating signal having sharp leading and trailing edges and of a duration corresponding to the length of time that the envelope signal appears at the output of peak detector 44. This gating signal, schematically represented at 46a, is applied to switching circuit 34 and causes the filtered luminance signal from filter 32 to be coupled to the color decoder throughout the period of the gating pulse 46a. Absent a gating pulse, the switching circuit 34 assumes its other operating position in which the full band luminance component is transmitted to the color decoder. Thus, the switching circuit is selectively gated in response to changes in the chrominance component between the top and bottom lines, which would otherwise appear in the luminance component as a spurious signal, to couple a filtered luminance component to the color decoder for so long as the spurious signal exists and at all other times transmitting the full band luminance signal to the color decoder.

It will be understood that the invention is susceptible to considerable modification and not limited to the above-described illustrative embodiment. For example, alternative configurations of the comb filter separator may be used, means other than the differential amplifier 40 may be utilized for deriving the chrominance difference signal, and the detector 44, gate generator 46 and switching circuit 34 can take a variety of known forms without departing from the spirit of the invention. Accordingly, all modifications and variations within the skill of the art are included within the spirit and intended scope of the invention as defined by the following claims.

I claim:

1. In luminance/chrominance separator apparatus including delay means for separating an NTSC television information signal into a main line component signal and adjacent line component signals, means for combining said main line component and said adjacent line component signals in predetermined amplitude proportions to thereby derive a luminance component signal which may contain a chrominance signal in the event there is a change in the chrominance component of said television information signal between said adjacent line component signals and means for deriving from said main line and adjacent line components a chrominance component signal, the improvement comprising:

switching circuit means having first and second input terminals and an output terminal, means for coupling the luminance component signal from said combining means to the first input terminal of said switching means, low pass filter means for filtering the luminance component signal from said combining means and for coupling the filtered luminance signal to the second input terminal of said switching means, said switching circuit means being operative to normally transmit a signal from its first input terminal to its output terminal and selectively operative in response to a gating signal to instead transmit a signal from its second input terminal to its output terminal, and means coupled to said delay means and responsive to differences in the chrominance component in said adjacent line component signals for producing and applying a gating signal to said switching circuit means to cause said filtered luminance signal to be coupled to the output terminal so long as there is a difference in the chrominance component in said adjacent line component signals.

2. Apparatus according to claim 1, wherein said low pass filter means is operative to filter out any chrominance component that might be present in the luminance component signal from said combining means.

3. Apparatus according to claim 2, wherein said means for producing said gating signal comprises:

means for subtracting one of said adjacent line component signals from the other to produce a difference signal representative of a difference in the chrominance component in said adjacent line component signals, means responsive to said difference signal for producing a signal corresponding to the envelope of said difference signal, and gate signal generating means responsive to said envelope signal for producing a gating pulse having a duration corresponding to the duration of said envelope signal.

4. Apparatus according to claim 3 wherein said envelope-signal-producing means includes band-pass filter means for filtering out such luminance component signals as might be contained in said difference signal, and peak detector means responsive to the output from said band-pass filter means for producing said envelope signal.

5. Apparatus according to claim 4, wherein said band-pass filter has a center frequency of 3.58 MHz.

6. In an apparatus for processing received television input signals containing luminance and chrominance components, said apparatus including separation means for combining different scanlines of the received television signal to derive the luminance component therefrom; a system for removing spurious chrominance components from the derived luminance signal while substantially maintaining the bandwidth of the derived luminance signal, comprising:

means for detecting vertical chrominance transitions within a television picture of said television input signal and for generating a control signal as a function of the transitions;

means for filtering the derived luminance signal; and switching means for receiving the derived luminance signal and the filtered luminance signal and responsive to said control signal for selecting as its output one of said derived luminance signal or said filtered luminance signal.

7. The system as defined by claim 6 wherein said means for detecting chrominance transitions in said television input signal is responsive to vertical chrominance transitions in said television input signal.

8. The system as defined by claim 7 wherein said means for detecting vertical chrominance transitions in said television input signal comprises means for comparing different scanlines of the received television signal.

9. The system as defined by claim 8 wherein said means for comparing different scanlines of the television input signal comprises means for subtracting the scanlines adjacent to a given scanline.

10. The system as defined by claim 6 wherein said apparatus for processing received television input signals further includes separation means for combining different scanlines of the received television signal to derive the chrominance component thereof.

* * * * *